United States Patent [19]
Fick

[11] Patent Number: 4,740,784
[45] Date of Patent: Apr. 26, 1988

[54] CHARACTER GENERATOR WITH ADDRESS MEMORY AND DATA STORAGE UNIT FOR CONTROLLING DOT MATRIX OUTPUT UNIT

[75] Inventor: Wolfgang Fick, Borchen, Fed. Rep. of Germany

[73] Assignee: Nixdorf Computer AG, Paderborn, Fed. Rep. of Germany

[21] Appl. No.: 883,475

[22] Filed: Jul. 14, 1986

Related U.S. Application Data

[63] Continuation of Ser. No. 667,079, Nov. 1, 1984, abandoned, which is a continuation of Ser. No. 363,690, Mar. 30, 1982, abandoned.

[30] Foreign Application Priority Data

Mar. 31, 1981 [DE] Fed. Rep. of Germany ....... 3112656

[51] Int. Cl.$^4$ ............................................... G09G 1/16
[52] U.S. Cl. ................................... 340/748; 340/728; 340/721
[58] Field of Search ............... 340/731, 745, 750, 728, 340/721

[56] References Cited

U.S. PATENT DOCUMENTS

| | | | |
|---|---|---|---|
| 3,130,397 | 4/1964 | Simmons | 340/746 |
| 3,426,344 | 2/1969 | Clark | 340/750 |
| 3,444,319 | 5/1969 | Artzt et al. | 178/30 |
| 3,503,063 | 3/1970 | Starr | 340/744 |
| 3,614,771 | 10/1971 | Band et al. | 340/762 |
| 3,675,232 | 7/1972 | Strout | 340/790 |
| 3,991,868 | 11/1976 | Robinson et al. | 197/1 R |
| 3,996,584 | 12/1976 | Plager | 340/790 |
| 4,059,183 | 11/1977 | Hoskins | 197/1 R |
| 4,122,533 | 10/1978 | Kubinak | 340/790 |
| 4,181,973 | 1/1980 | Tseng | 340/751 |
| 4,283,724 | 8/1981 | Edwards | 340/790 |
| 4,409,591 | 10/1983 | Simkovitz | 340/731 |
| 4,414,545 | 11/1983 | Sakurada et al. | 340/790 |

FOREIGN PATENT DOCUMENTS

2050019A 12/1980 United Kingdom .

OTHER PUBLICATIONS

G. Douglas, "Printer Font Compression Technique", IBM Technical Disclosure Bulletin, vol. 19, No. 8, pp. 2851–2852, (Jan. 1977).

F. Farmer, "Segment Printer", IBM Technical Disclosure Bulletin, vol. 14, No. 3, p. 782, (Aug. 1971).

D. Mrazek, "Save ROMs in High-Resolution Dot-Matrix Displays and Printers", Electrical Design News, pp. 56–64, (May 5, 1973).

*Primary Examiner*—Marshall M. Curtis
*Attorney, Agent, or Firm*—Cullen, Sloman, Cantor, Grauer, Scott & Rutherford

[57] ABSTRACT

A character generator which converts character code words into data items, namely column code words (C code), for controlling a dot matrix output unit, is disclosed. The character code word is presented to an address memory circuit which generates a ten-bit-long column address (CAD) that identifies the locations of the column code words within a separate data storage unit. The address memory circuit includes two memory units (PROM 1, PROM 2) which store only the first eight bits of respective column data addresses, while an additional memory unit (PROM 3) stores the remaining two bits of the respective column data addresses. A multiplexer (15) is used to select the correct two bits of each respective column data address from an eight-bit word output by the additional memory unit (PROM 3) at the same time an eight-bit address is being output by one of the first two memory units (PROM 1, PROM 2). The ten-bit address thus output by the address memory circuit is applied to the data storage unit, which may be built up by using commercially available programmable read-only memory units (PROM 4, PROM 5, PROM 6), as may the address memory circuit. For a further utilization of the storage capacity of the additional memory unit (PROM 3) of the address memory circuit, the first eight bits of additional column data addresses may be stored therein. These first eight bits are then fed to the data storage unit by way of a switching amplifier (14), with the multiplexer (15) supplementing the additional column data addresses with two bits which are zeros in order to produce a ten-bit address.

11 Claims, 4 Drawing Sheets

| C No. | C CODE 1... ...8 | 9... ...16 | 17... ...24 | TYPE | C AD 10 BIT No. 1 |
|---|---|---|---|---|---|
| 1 | 00000000 | 00000000 | 00000000 | 0 | 0000000000 |
| 2 | 00000000 | 00000000 | 00000000 | 0 | 0000000000 |
| 3 | 00000000 | 00000000 | 00000000 | 0 | 0000000000 |
| 4 | 00000000 | 00000000 | 00000000 | 0 | 0000000000 |
| 5 | 00000000 | 00000100 | 00000000 | 1 | 0000000001 |
| 6 | 00000000 | 00001000 | 00000000 | 2 | 0000000010 |
| 7 | 00000000 | 00010000 | 00000000 | 3 | 0000000011 |
| 8 | 00000000 | 00100000 | 00000000 | 4 | 0000000100 |
| 9 | 00000000 | 01000000 | 00000000 | 5 | 0000000101 |
| 10 | 00000000 | 10000000 | 00000000 | 6 | 0000000110 |
| 11 | 00000001 | 00010000 | 00000000 | 7 | 0000000111 |
| 12 | 00000010 | 00000000 | 00000000 | 8 | 0000001000 |
| 13 | 00000100 | 00000000 | 00000000 | 9 | 0000001001 |
| 14 | 00001000 | 00000000 | 00000000 | 10 | 0000001010 |
| 15 | 00010000 | 00010000 | 00000000 | 11 | 0000001011 |
| 16 | 00000000 | 00000000 | 00000000 | 0 | 0000000000 |
| 17 | 00100000 | 00000000 | 00000000 | 12 | 0000001100 |
| 18 | 00000000 | 00000000 | 00000000 | 0 | 0000000000 |
| 19 | 00010000 | 00010000 | 00000000 | 11 | 0000001011 |
| 20 | 00001000 | 00000000 | 00000000 | 10 | 0000001010 |
| 21 | 00000100 | 00000000 | 00000000 | 9 | 0000001001 |
| 22 | 00000010 | 00000000 | 00000000 | 8 | 0000001000 |
| 23 | 00000001 | 00010000 | 00000000 | 7 | 0000000111 |
| 24 | 00000000 | 10000000 | 00000000 | 6 | 0000000110 |
| 25 | 00000000 | 01000000 | 00000000 | 5 | 0000000101 |
| 26 | 00000000 | 00100000 | 00000000 | 4 | 0000000100 |
| 27 | 00000000 | 00010000 | 00000000 | 3 | 0000000011 |
| 28 | 00000000 | 00001000 | 00000000 | 2 | 0000000010 |
| 29 | 00000000 | 00000100 | 00000000 | 1 | 0000000001 |
| 30 | 00000000 | 00000000 | 00000000 | 0 | 0000000000 |
| 31 | 00000000 | 00000000 | 00000000 | 0 | 0000000000 |
| 32 | 00000000 | 00000000 | 00000000 | 0 | 0000000000 |
| 33 | 00000000 | 00000000 | 00000000 | 0 | 0000000000 |

| C No. | C CODE 1...   ...8 | 9...   ...16 | 17...   ...24 | TYPE | C AD 10 BIT No. 1 |
|---|---|---|---|---|---|
| 1 | 00000000 | 00000000 | 00000000 | 0 | 0000000000 |
| 2 | 00000000 | 00000000 | 00000000 | 0 | 0000000000 |
| 3 | 00000000 | 00000000 | 00000000 | 0 | 0000000000 |
| 4 | 00000000 | 00000000 | 00000000 | 0 | 0000000000 |
| 5 | 00000000 | 00000100 | 00000000 | 1 | 0000000001 |
| 6 | 00000000 | 00001000 | 00000000 | 2 | 0000000010 |
| 7 | 00000000 | 00010000 | 00000000 | 3 | 0000000011 |
| 8 | 00000000 | 00100000 | 00000000 | 4 | 0000000100 |
| 9 | 00000000 | 01000000 | 00000000 | 5 | 0000000101 |
| 10 | 00000000 | 10000000 | 00000000 | 6 | 0000000110 |
| 11 | 00000001 | 00010000 | 00000000 | 7 | 0000000111 |
| 12 | 00000010 | 00000000 | 00000000 | 8 | 0000001000 |
| 13 | 00000100 | 00000000 | 00000000 | 9 | 0000001001 |
| 14 | 00001000 | 00000000 | 00000000 | 10 | 0000001010 |
| 15 | 00010000 | 00010000 | 00000000 | 11 | 0000001011 |
| 16 | 00000000 | 00000000 | 00000000 | 0 | 0000000000 |
| 17 | 00100000 | 00000000 | 00000000 | 12 | 0000001100 |
| 18 | 00000000 | 00000000 | 00000000 | 0 | 0000000000 |
| 19 | 00010000 | 00010000 | 00000000 | 11 | 0000001011 |
| 20 | 00001000 | 00000000 | 00000000 | 10 | 0000001010 |
| 21 | 00000100 | 00000000 | 00000000 | 9 | 0000001001 |
| 22 | 00000010 | 00000000 | 00000000 | 8 | 0000001000 |
| 23 | 00000001 | 00010000 | 00000000 | 7 | 0000000111 |
| 24 | 00000000 | 10000000 | 00000000 | 6 | 0000000110 |
| 25 | 00000000 | 01000000 | 00000000 | 5 | 0000000101 |
| 26 | 00000000 | 00100000 | 00000000 | 4 | 0000000100 |
| 27 | 00000000 | 00010000 | 00000000 | 3 | 0000000011 |
| 28 | 00000000 | 00001000 | 00000000 | 2 | 0000000010 |
| 29 | 00000000 | 00000100 | 00000000 | 1 | 0000000001 |
| 30 | 00000000 | 00000000 | 00000000 | 0 | 0000000000 |
| 31 | 00000000 | 00000000 | 00000000 | 0 | 0000000000 |
| 32 | 00000000 | 00000000 | 00000000 | 0 | 0000000000 |
| 33 | 00000000 | 00000000 | 00000000 | 0 | 0000000000 |

CHARACTER GENERATOR WITH ADDRESS MEMORY AND DATA STORAGE UNIT FOR CONTROLLING DOT MATRIX OUTPUT UNIT

This is a continuation of co-pending application Ser. No. 667,079 filed on Nov. 1, 1984, now abandoned, which is a continuation of Ser. No. 363,690, filed Mar. 30, 1982, now abandoned.

TECHNICAL FIELD

The invention relates to a character generator for contolling a dot matrix character output unit as a function of character code words with an address memory to which are applied the character code words. The character generator includes at least one memory unit and one multiplexer. The generator outputs area addresses, and further includes a data storage unit addressed by the memory unit in which data items are stored which respectively indicate an area, including a plurality of points, or a character formed by the output unit from a plurality of such regions within a given point matrix. Means are also provided which, after delivering an area address indicating a first area of a character to be formed from the address memory, stepwise form the area addresses of the remaining regions of the same character one after another.

BACKGROUND ART

A character generator is known from German Auslegeschrift No. 2,701,328. In this disclosure data items are respectively stored in the data storage unit together with interlinking bits which indicate whether after reading out a data item from the data storage unit, the next successive stored data item is to be read out of the data storage unit or whether the data item to be read out involves that of the last area of a character to be formed, so that after the reading out of this data item the addressing of the data storage unit has to be done with the are address of the first area of the next succeeding character. Here the number of storage locations in the data storage unit must correspond to the product of the character supply of different characters to be formed times the number of areas per character, so that, also taking into account the additional interlinking bits required, a large storage capacity of the data storage unit is required.

A character generator for controlling a dot matrix character output unit as a function of character code words is also known from West German Pat. No. B1,118,121, which includes an address converter formed by relays which emits area addresses, and a data storage unit addressed by this and formed by a diode matrix, where all the area addresses are formed by the address converter, and a number of data items equal to the area supply of different areas is stored in the data storage unit. Since areas equal to one another often occur in different characters and even within the same character, so that the area supply of different areas is considerably smaller than the product of character supply times number of areas per character, this solution results in a considerably lower storage capacity of the data storage unit than in the character generators previously known, and while the required expense regarding the address converter is increased, a lower total fabrication cost for the character generator is required.

DISCLOSURE OF THE INVENTION

The invention is based on the problem of further developing a character generator of the type mentioned at the outset in such a way that it can be built in a simple manner with the use of commercially available memory units and with the most extensive possible utilization of their storage capacity.

The problem is solved according to the invention, for a character generator of the type mentioned at the start, by having all area addresses formed by the address memory, by having a number of data items stored in the data storage unit which is equal to the area supply of different areas, by having the address memory include a plurality of memory units, the output signals of which, delivered in a parallel representation, are shorter than one area address, by having at least a first memory unit of the address memory form a first area address part as an output signal, by having the residual second part of the area address stored in a second memory unit of the address memory for each area address stored in the first memory unit in relation to the first part of the area address, where the output signal of the second memory unit contains a plurality of second instruction address parts in a parallel representation, and by having the respective first part of the area address applied directly to the data storage unit and the related second part of the area address applied by way of the multiplexer.

In the character generator according to the invention, all area addresses are formed by the address memory in an intrinsically known manner, whereas in the data storage unit, a number of data items equal to the area supply of different areas is stored so that the data storage unit gets by with a relatively small memory storage capacity as compared with the case where the total of character supply, data items and additional interlinking bits are stored in it. The cost of the address memory, on the other hand, is kept low by the fact that the latter can be built by the use of commercial memory units the output signal of which, emitted in a parallel representation, is shorter than one area address. A first memory unit or a plurality of first memory units of this address memory form a first part of an area address. The lacking area address second part of each area address is supplied by a second memory unit of the address memory, the output signal of which, emitted in parallel representation, is likewise shorter than an area address, but longer than a second area address part, so that the output signal of the second memory unit contains a plurality of second area address parts in parallel representation. The selection among these second area address parts thus simultaneously appearing in the output signal of the second memory unit is done by a multiplexer, while the first area address parts are applied directly to the data storage unit for its addressing. The multiplexer has only a small number of inputs, since it is connected to the output of only the second memory unit and not of the first memory unit or a plurality of first memory units, so that as regards to construction costs and selection speed it is of a simple type.

The invention will be described in detail in the following on the basis of drawings in which an embodiment example is represented.

BRIEF DESCRIPTION OF THE DRAWINGS

FIG. 2A shows a table of the data items required for the column representation of the character "A" in FIG. 1;

FIG. 2B shows a table of the addresses of the data items according to FIG. 2A;

FIGS. 4A 4B and 4C show address tables for explaining the memory content of the memory units of the address memory of the character generator according to FIG. 3.

BEST MODE FOR CARRYING OUT THE INVENTION

Figure 1:
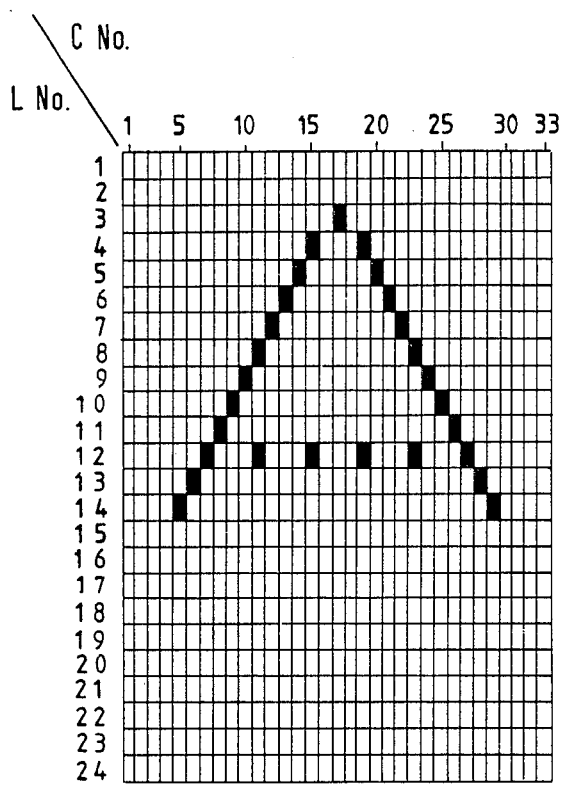
FIG. 1 shows a dot matrix with a characters "A" formed in it.

In the following example it will be assumed that a dot matrix character output unit forms alphanumeric or other signs by columns in a point or dot matrix, the dot matrix consisting of 24 lines L and 40 columns C; in FIG. 1 the lines L Nos. 1 to 24 and the columns C Nos. 1 to 33 are represented, while for reasons of simplicity the columns C Nos. 34 to 40 are omitted. With this relatively large number of lines and columns, characters can also be represented with descenders and laterally adjacent to one another, and curves and slopes of letters can be reproduced with no distortion detectable by the eye. The black surfaces in FIG. 1 represent the centers of points which are generated by the output unit used and which have a diameter of approximately three line widths and six column widths, as is common when ink-drop printers or matrix printers are used as the output unit. The crossbar in the letter "A" is then a continuous line, and the character is closed at the top.

In the table of FIG. 2A a data item designated as C code is given for each of columns C Nos. 1 to 33, as is necessary for energizing a print unit operating in parallel by columns or any similar output unit. A line formed by 40 columns would require a storage field of 24 times 40 bits, and if necessary additional storage capacity for interlinking bits, for storing all of its columns in the form of the table of FIG. 2A. But actually in the character "A", as is seen in FIG. 2B, only a total of 13 types of columns C composed of points in a different way occur. The same holds true for other characters to be represented, besides which the characters of a supply of characters to be represented in any case partly agree as regards to the types of columns occurring in them. The data items or C codes stored in the data storage unit of a character generator can thus be addressed, for example by means of area addresses, or in the present case, where the areas are columns, by means of column addresses, which show 10 bits according to the example of the second column headed "C AD" of FIG. 2B. Such column addresses C AD are used in the embodiment example.

For a character supply of a total of 128 different characters, which can be represented with character code words of 7 bits each, it was found that for a definition of the characters on a character matrix of 24 lines L and 40 columns C, a column supply of up to 1,024 different columns may be required according to the type numbered in the first column of FIG. 2B. The whole of the types can therefore be called up with the 10 bit long address C AD as in the embodiment example. With these column addresses, in the embodiment example, a data storage unit is addressed which is formed by three commercially available 1,000 8 bit memory units (PROM 4 to 6 in FIG. 3) which store 1,000 different 24 bit data items (C code in FIG. 2A). Thus a total storage capacity of 24,000 bits for the data items and 128 times 40 times 10 bits for the column address table of an address memory are required.

Figure 3:
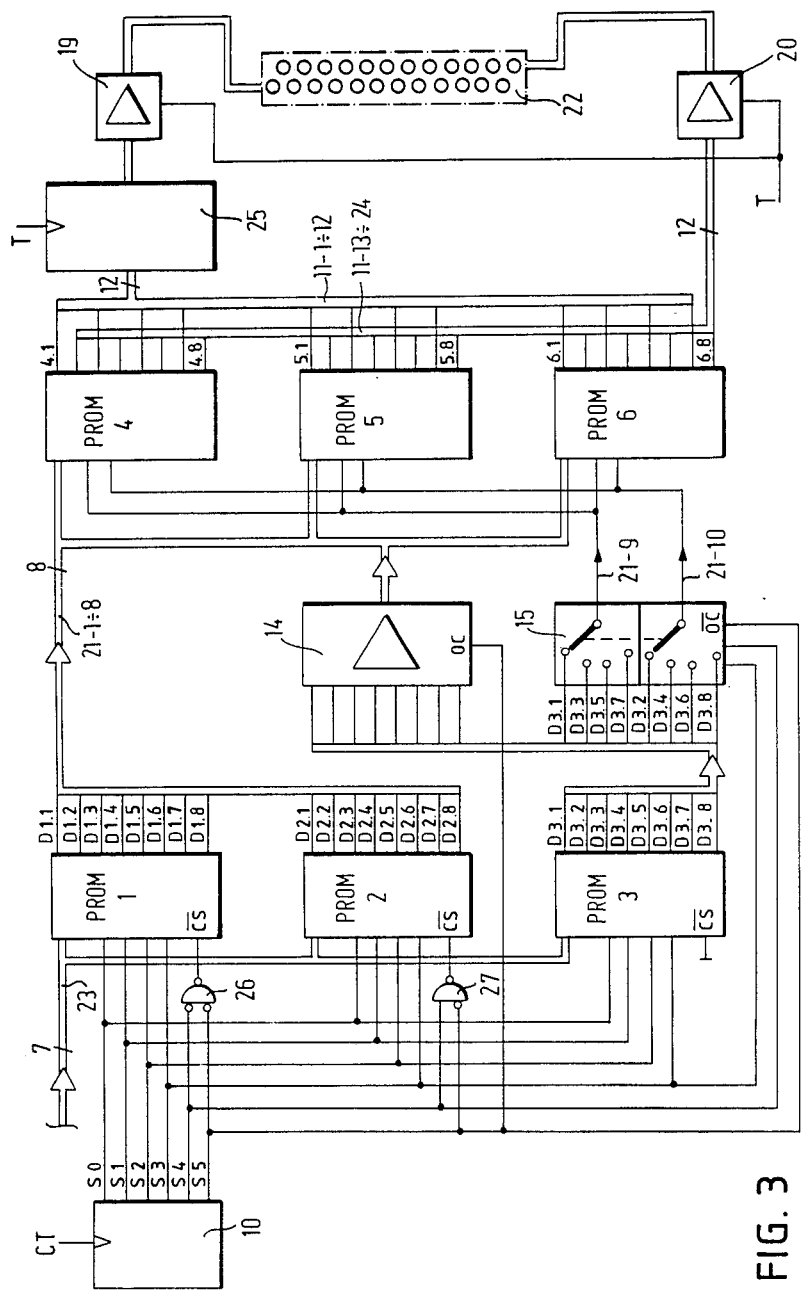
FIG. 3 shows the circuit diagram of a character generator according to the invention and of a dot matrix character output unit controlled by this.

The character generator operating according to the above explanations is represented in FIG. 3. Character code words consisting of 7 bits are fed in parallel representation by way of a cable 23 including seven lines from a source not represented, for example, a data processing device, to an address memory which includes three memory units PROM 1, PROM 2, PROM 3. These involve commercially available programmable read only memories, but, in a deviation from this which is within the scope of the invention, straight read only memories (ROM's) can be used. Their storage capacity is 2,048 times 8 bits each, so that their output signals of 8 bits, emitted in parallel representation, are shorter than one column address C AD, which includes 10 bits according to FIG. 2B. Four address inputs of each memory unit PROM 1, PROM 2, PROM 3 are energized by a column counter 10 operating by modulo-40, which counter, in the embodiment example, counts the respective column position synchronously with the motion of a printing head and by means of clock pulse CT generated then, i.e. in synchrony with the print head. In other embodiments, in the usual way, column addressed corresponding to the stepwise emission of column addresses or other area addresses are also formed by having the delivery of a data item (C code in FIG. 2A) to an output unit or the representation of a foregoing column done by means of this output unit. The column counter 10 show parallel outputs S0 to S5. By decoding the signals from the outputs S4, S5 by means of gates 26, 27 provided as decoders, CS signals are obtained which are applied to the clear inputs of the memory units PROM 1, PROM 2, and their outputs D1.1 to D1.8 or D2.1 to D2.8 are thereby cleared. These are connected in pairs parallel to one another to eight lines 21-1 to 21-8 in such a way that for example the outputs D1.1 and D2.1 are connected to the line 21-1.

In the memory unit PROM 1, a first column address part consisting of 8 bits is stored for each character A−1, A, A+1, . . . for each column C No. 1 to No. 16. In a corresponding way, a first column address part is stored in the memory unit PROM 2 for each character A−1, A, A+1, . . . for the columns C Nos. 17 to 32 inclusive. In the memory unit PROM 3, the clear input of which has the clear signal $\overline{CS}$ continuously applied to it, is stored the remaining second column address part, consisting of Bits No. 9 and No. 10, for each column address stored in the memory units PROM 1, PROM 2 relating to the first column address part. Since the memory unit PROM 3 as well as the memory PROM 1 and PROM 2 shows 8 bits per storage location, the output signal of the memory unit PRO3 contains four second column address parts in parallel representation. The selection of the respective second column address part, which is required for completing a column address C AD (FIG. 2B), from the output signal of the memory unit PROM 3 is done by the multiplexer 15, which is connected to the outputs D3.1 to D3.8 by its inputs and which for this purpose is energized by the outputs S3, S4 of the column counter 10. The multiplexer 15 shows two outputs corresponding to bit No. 9 and bit No. 10 respectively of the column addresses.

The lines 21-1 to 21-8, and the lines 21-9, 21-10 connected to the outputs of the multiplexer 15, run to the address inputs of a data storage unit, which in the embodiment example is formed by the memory units PROM 4, PROM 5, PROM 6, each of which shows a storage capacity of 1,000 times 8 bits. On the outputs 4.1 to 4.8, 5.1 to 5.8 and 6.1 to 6.8 of the memory units PROM 4, PROM 5, PROM 6 appear data items (C code in FIG. 2A) depending on their addressing, which control a printing head 22 formed as a matrix printer in a manner yet to be described.

If for example during the printing of the character "A" (FIG. 1) its column C No. 9 is to be printed, then the data item according to FIG. 2A of the C code which is to be delivered to the printer head 22 is 00000000 01000000 00000000.

For this the data storage unit formed by the memory units PROM 4, PROM 5, PROM 6 according to FIG. 2B must be addressed with the column address C AD 0000000101 (Type 5), where in this notation the first bit is bit No. 10 and the last bit is bit No. 1. The first column address part of the column address C AD (FIG. 2B) comprising bits No. 1 to No. 8 is stored according to FIG. 4A in the memory unit PROM 1 in the memory area for the character "A" under C No. 9. This first column address part is fed directly to the memory units PROM 4, PROM 5, PROM 6 when it is emitted.

Figures 4A, 4B, 4C:
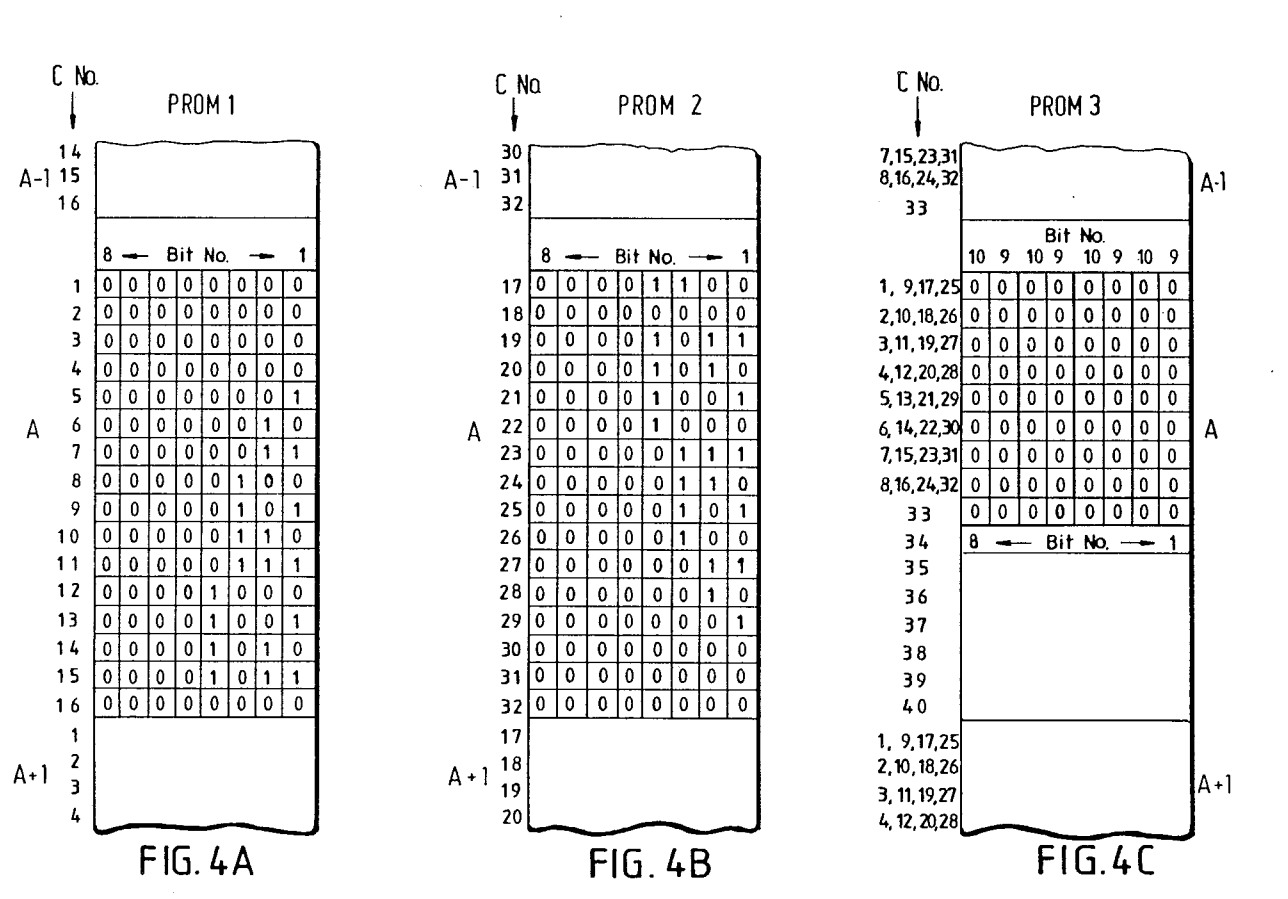

The second column address part of column C No. 9 is stored according to FIG. 4C in the memory unit PROM 3 in a memory area assigned to the character "A" on a storage location which, in addition to this second address part also includes the second column address part of columns C Nos. 1, 17 and 25 including the bits Nos. 9 and 10. The selection of the second column address part involved in the example for the column C No. 9 is made by the multiplexer 15 (FIG. 3), after which the second column address part selected is fed to the memory units PROM 4, PROM 5, PROM 6 by way of the lines 21-9 and 21-10. In a corresponding manner, in printing one of columns C No. 17 to 32 inclusive of the character "A", the first address part stored in the memory unit PROM 2 according to FIG. 4B is fed directly to the data storage unit and the second column address part stored in the memory unit PROM 3 is fed by way of the multiplexer 15 to the data storage unit.

It is advantageous for the length of the column addresses on the one hand and the number of bits (8 bits in the embodiment example) per storage location of the memory units PROM 1, PROM 2, PROM 3, which are equal to one another to be however chosen such that the number of bits per storage location is a whole-number multiple of the bits contained in the second column address part (two bits in the embodiment example) in order to be able to utilize each storage location of the memory unit PROM 3 loaded with second column address parts completely in a simple way. If for example the two bits of the second column address part of a number of column addresses are stored in successive storage locations, then the multiplexer 15 would have to read these bits one after another, and buffer means would have to be provided in order to be able to present all of the bits of a column address thus formed to the data storage unit at the same time, which would increase the cost.

Since the memory unit PROM 3 has the same design as regards to storage capacity as the memory units PROM 1 and PROM 2, its storage capacity in many cases including the embodiment example, exceeds those binary numbers with which a complete utilization of the storage space of the address memory is possible. This excessive storage capacity of the memory unit PROM 3 is utilized fully by having the first column address parts of additional column addresses, which are shorter than the column addresses stored in it, which first parts are applied to the data storage unit by way of a switching amplifier 14 while bypassing the multiplexer 15, and by having the multiplexer 15, when such a first column address part of an additional column address is applied to the data storage unit, deliver two bits with a binary value which is constant—zero in the embodiment example—for all these second area address parts, as the related second column address part. In the embodiment example, this kind of only partial storage of the column addresses for the columns C Nos. 33 to 40 inclusive is provided, each of which then consist according to FIG. 4C of a first column address part with bits Nos. 1 to 8 as well as of two annexed bits with the value zero. It has been shown that for these columns C Nos. 33 to 40, it is sufficient to address only a small number of data items of the data storage unit, so that the column address which is variable only in regard to the first column address part is sufficient for suitable characters. This is true also because the assignment of the data items to their column address can be chosen in any desired way.

If the output signal combination of the column counter 10 corresponds to a column C Nos. 33 to 40 to be output, the memory units PROM 1 and PROM 2 are blocked by means of the gates 26, 27 connected before them. At the same time, the multiplexer 15 is blocked by a signal coming from the output S5 of the column counter 10 and fed to its inverting input $\overline{OC}$, so that its outputs receive a zero signal. On the other hand, here the outputs D3.1 to D3.8 of the memory unit PROM 3 are now connected with the lines 21-1 to 21-8 through the switching amplifier 14, since the switching amplifier 14 is selected by means of a signal fed to its input OC from the column counter 10.

The output signals of the memory units PROM 4, PROM 5, PROM 6 are fed in two groups on 12 lines each 11-1 to 11-12 and 11-13 to 11-24 to the 24 print elements of the printer head 22 by way of amplifiers 19, 20 while being controlled by a synchronous clock pulse T which is derived from the printer head transport. The print elements here are arranged in the usual way alternating in two columns displaced in the line direction. Correspondingly to the column displacement of the print elements, the twelve points of the odd-numbered lines L (FIG. 1) of the previous column C are fed delayed to the amplifier 19 by way of a twelve-place shifting register 25 of a length corresponding to the shift, controlled by the synchronous clock pulse T.

The memory units PROM 4, PROM 5, PROM 6, of the data storage unit are preferably all of the same type and the same storage capacity as the memory units PROM 1, PROM 2, PROM 3 of the address memory, as in the embodiment example, that is, commercially available programmable read only units or if necessary straight read only units.

Obviously modifications of the embodiment example described are possible within the scope of the invention. Thus other dot matrix formats with different numbers of columns and lines than the embodiment example may be chosen. Also, commercially available memory units which are different as regards to storage location length and storage capacity may be used both for the address memory and for the data storage unit. The data items output by the data storage unit may serve not only for the control of printer heads printing with one or two column displacement but also for the control of other point grid character output units such as for example visual indicators. Whereas, the embodiment example is based on the formation of characters by columns within a dot matrix, the data items stored in the data storage unit can also designate other areas of a dot matrix, lines for example.

I claim:

1. A character generator for controlling a dot matrix output unit to form a character selected by a character code word from a character set having a plurality of characters which may be each formed by grouping together a selected one or plurality of dot patterns stored as data in a plurality of addressable memory locations to form a predetermined dot matrix corresponding to the selected character, the generator comprising:

address memory means, responsive to the character code word, for generating a plurality of data addresses, each data address being formed in parallel of a first address part and a second address part, the address memory means including (a) a first memory unit, having a plurality of storage locations, for storing a plurality of first address parts and for outputting single first address parts one at a time, (b) a second memory unit, having a plurality of storage locations, for storing at least several second address parts and for outputting a plurality of second address parts simultaneously, and (c) multiplexer means for selecting one of said second address parts from the plurality of second address parts output by the second memory unit for delivery in parallel with the single first address part being outputted by the first memory unit at that time;

data storage unit means, having a plurality of storage locations addressable by said data addresses for storing dot patterns as data in said addressable storage locations, with each distinct dot pattern being addressable by a distinct one of said data addresses, the data storage unit means being operatively arranged to respond to the data addresses it receives from the address memory means by outputting the dot patterns stored at the corresponding storage locations; and sequencing means for accessing predetermined locations in the address memory means to generate successively the data address of each dot pattern which forms part of the predetermined dot matrix corresponding to the character selected by the character code word, whereby all of the data addresses for the dot patterns used in each dot matrix corresponding to the character selected by one character code word are generated by the address memory means.

2. A character generator according to claim 1 wherein the first memory unit of the address memory means is operatively arranged such that first address parts output therefrom are delivered directly to the data storage unit means, and, the multiplexer means includes at least one multiplexer unit for delivering to the data storage unit means the second address parts associated with the first address parts being delivered directly to the data storage unit means.

3. A character generator according to claim 2, wherein the second memory unit is operatively arranged for also storing selected first address parts and for outputting, in response to a predetermined signal from the sequencing means, a single low order address part directly to the data storage unit means without passing it through the multiplexer unit, and the multiplexer means is operatively arranged also for delivering in response to the predetermined signal from the sequencing means, a second address part associated with the single first address part being outputted thereby, said associated second address part having at least one bit which is of a predetermined unchanging binary value.

4. A character generator according to claim 1, wherein said sequencing means includes counter means for causing successive locations in the address memory means to be accessed sequentially in order to generate successively the data address of each dot pattern forming part of the predetermined dot matrix corresponding to the character selected by the code word.

5. A character generator according to claim 3, wherein said sequencing means includes a counter for causing successive locations in the address memory means to be accessed sequentially in order to generate successively the data addresses of each dot pattern forming part of a predetermined dot matrix corresponding to the character selected by the code word, said counter having parallel outputs, at least some which are directly connected to and provide addressing signals to the first and second memory units and the multiplexer unit.

6. A character generator according to claim 1 wherein the first and second memory units are formed from memory units of the same kind.

7. A character generator according to claim 5 wherein the first and second memory units are formed from solid-state memory devices of the same kind selected from the group of memory devices consisting of programmable readonly memories and read-only memories.

8. A character generator according to claim 1 wherein the data storage unit means has a plurality of storage units, each of which are memory units of the same kind.

9. A character generator according to claim 8 wherein the memory units of the data storage means and the first and second memory units of the address memory means are memory units of the same kind.

10. A character generator according to claim 1 wherein the data storage unit means has a plurality of storage units, each of which stores a distinct portion of each dot pattern, and wherein said address memory means is operatively arranged to output each data address to each storage unit simultaneously.

11. A character generator according to claim 1 wherein the first and second address parts of each data address constitute the higher and lower order address bits of the data address respectively, and wherein the number of bits in each of the first address parts is an integer multiple of the number of bits in each of the second address parts.

* * * * *